(12) United States Patent
DeLong et al.

(10) Patent No.: US 11,037,388 B2
(45) Date of Patent: Jun. 15, 2021

(54) SYSTEMS AND METHODS FOR CREATING A PASSWORD AND/OR A KEYPAD CODE FOR EXECUTING KEYLESS OPERATIONS UPON A VEHICLE

(71) Applicant: Ford Global Technologies, LLC, Dearborn, MI (US)

(72) Inventors: Aaron Matthew DeLong, Toledo, OH (US); Eugene Karpinsky, Farmington Hills, MI (US); Cameron Smyth, Wyandotte, MI (US); Timothy Thivierge, Jr., Carleton, MI (US); Daniel M. King, Northville, MI (US); Kevin Thomas Hille, Plymouth, MI (US); Farhan Ehsan, Lasalle (CA); John Robert Van Wiemeersch, Novi, MI (US); Santosh Kumar Lalwani, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/597,551

(22) Filed: Oct. 9, 2019

(65) Prior Publication Data
US 2021/0110623 A1 Apr. 15, 2021

(51) Int. Cl.
*G07C 9/00* (2020.01)
*G06F 21/60* (2013.01)
*B60R 25/24* (2013.01)
*B60R 25/23* (2013.01)
(Continued)

(52) U.S. Cl.
CPC ............. *G07C 9/21* (2020.01); *B60R 25/23* (2013.01); *B60R 25/24* (2013.01); *B60R 25/25* (2013.01);
(Continued)

(58) Field of Classification Search
CPC ............. G07C 9/21; G07C 9/23; G07C 9/33; G07C 9/25; G07C 9/253; G07C 9/257;
(Continued)

(56) References Cited

U.S. PATENT DOCUMENTS

| | | | | |
|---|---|---|---|---|
| 5,113,182 A | * | 5/1992 | Suman | ............... B60R 25/2081 307/10.2 |
| 2003/0071715 A1 | * | 4/2003 | Lavelle | ................... G07C 9/27 340/5.5 |

(Continued)

*Primary Examiner* — Edwin C Holloway, III
(74) *Attorney, Agent, or Firm* — Frank Lollo; Eversheds Sutherland (US) LLP

(57) ABSTRACT

Exemplary embodiments described in this disclosure are generally directed to systems and methods for securely creating passwords for performing various keyless operations upon a vehicle. In an exemplary method, a computer receives a request for creating a password for a phone-as-a-key (PaaK) device. The computer determines that the PaaK device is present inside the vehicle and that the vehicle engine has been placed in an accessory state or a run state by an authorized PaaK device located in the vehicle. The computer further determines that a passive entry passive start (PEPS) key fob is present inside the vehicle. A prompt is provided for entry of a password. The computer checks to determine if an entered password has been already assigned to another PaaK device. If unassigned, the computer links the password to the PaaK device and authorizes the entered password as a valid keyless starting password for the vehicle.

20 Claims, 5 Drawing Sheets

(51) Int. Cl.
*B60R 25/25* (2013.01)
*G07C 9/21* (2020.01)

(52) U.S. Cl.
CPC ...... *G06F 21/602* (2013.01); *B60R 2325/103* (2013.01); *B60R 2325/108* (2013.01); *B60R 2325/205* (2013.01)

(58) Field of Classification Search
CPC ............... G07C 9/26; G07C 9/00817; G07C 2009/00825; G07C 2009/00833; G07C 2009/00841; G07C 2009/00301; G07C 2009/00547; G07C 2209/63; B60R 25/23; B60R 25/24; B60R 25/25; B60R 2325/103; B60R 2325/108; B60R 2325/205; G06F 21/602
USPC ...................................... 340/5.23, 5.24, 5.72
See application file for complete search history.

(56) References Cited

U.S. PATENT DOCUMENTS

| | | | | |
|---|---|---|---|---|
| 2003/0090364 | A1* | 5/2003 | Cardinale | E05B 43/005 340/5.54 |
| 2005/0179519 | A1* | 8/2005 | Kawamura | B60R 25/24 340/5.23 |
| 2014/0091903 | A1* | 4/2014 | Birkel | G07C 9/20 340/5.54 |
| 2016/0300417 | A1* | 10/2016 | Hatton | G07C 9/00857 |
| 2016/0371907 | A1* | 12/2016 | Ma | E05B 17/10 |
| 2017/0309098 | A1* | 10/2017 | Watters | G07C 9/00309 |
| 2018/0009416 | A1* | 1/2018 | Maiwand | G07C 9/00309 |
| 2019/0061687 | A1* | 2/2019 | Khalil | B60R 25/2072 |

* cited by examiner

SYSTEMS AND METHODS FOR CREATING A PASSWORD AND/OR A KEYPAD CODE FOR EXECUTING KEYLESS OPERATIONS UPON A VEHICLE

FIELD OF THE DISCLOSURE

This disclosure generally relates to operations associated with a vehicle and more particularly relates to systems such as a phone-as-a-key system that may be used to start a vehicle.

BACKGROUND

Car manufacturers constantly strive to provide various features and devices that make it more convenient or pleasurable for a consumer to drive a vehicle. For example, many car manufacturers now provide an infotainment system that combines various entertainment devices (such as a radio), streaming audio solutions, and USB access ports for digital audio devices, with elements such as a navigation system that provides navigation instructions to a driver of the car. As another example, many car manufacturers now offer a passive entry (cabin unlock) and passive start (engine starting) system that eliminates the need for a driver to insert a key into a door lock cylinder or ignition lock. One passive engine starting system incorporates the presence of a key fob for starting an engine without the need for inserting a mechanical key into an ignition lock cylinder. Another passive entry and start system, which is generally referred to as a phone-as-a-key (PaaK) system, involves the use of a smartphone in place of a passive key. The driver may enter a unique password into the smartphone that enables the operation of the engine via the engine-start push-button in the vehicle. In a variation of this system, the driver may enter the password into an infotainment system in the vehicle that then enables the operation of the engine-start push-button. However, password entry systems can be vulnerable to hacking and malicious misuse. Consequently, it is desirable to provide systems and methods that allow secure creation and use of passwords and/or keypad codes for use on vehicles.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
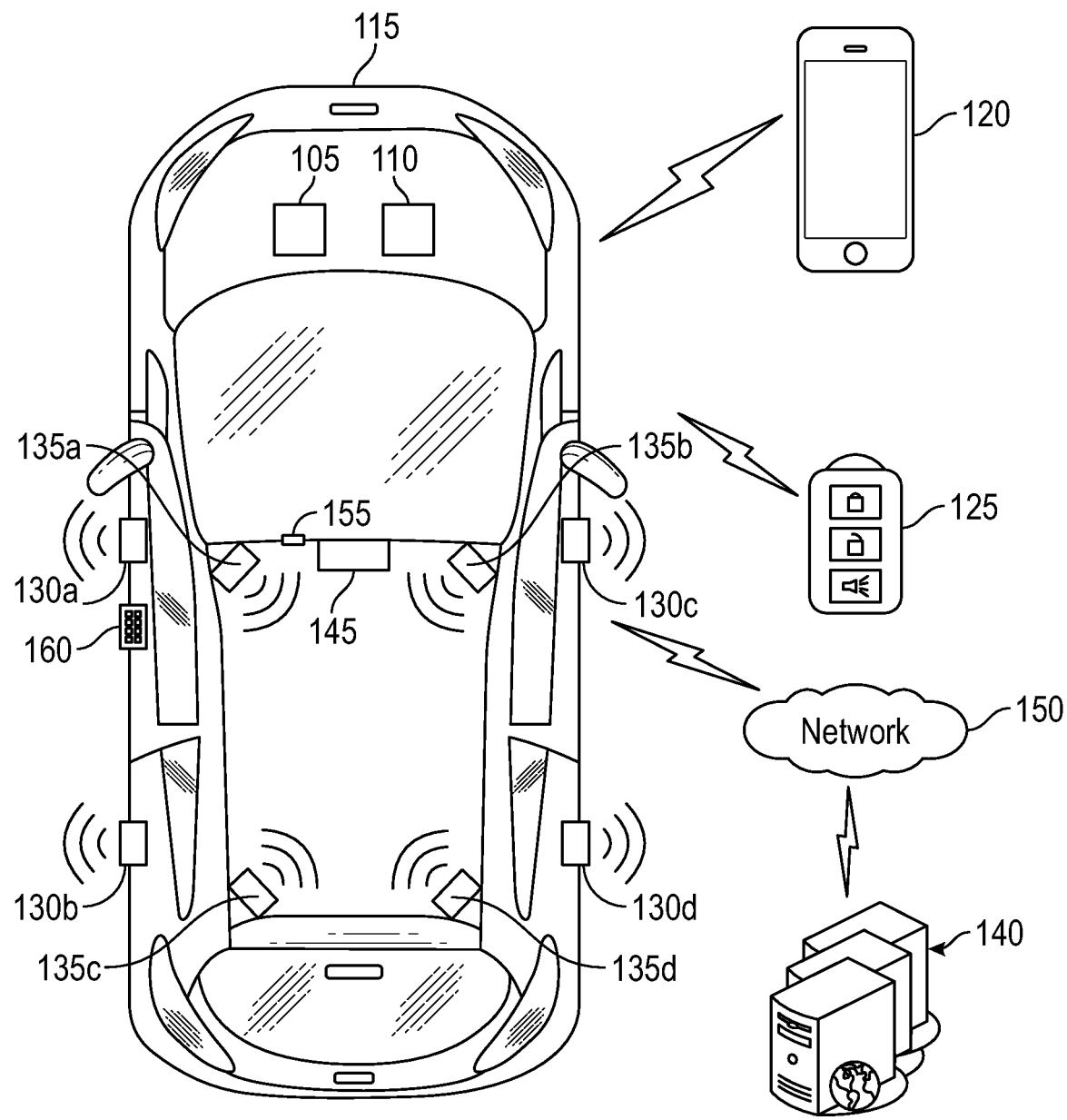
FIG. 1 shows an exemplary vehicle that supports various remote entry and passive operations in accordance with the disclosure.

In terms of a general overview, certain embodiments described in this disclosure are directed to systems and methods related to securely creating a password and/or a keypad code for carrying out various keyless operations upon a vehicle. In an exemplary method in accordance with the disclosure, a computer in a vehicle receives a request for creating a password as a back-up solution for a phone-as-a-key (PaaK) system. The computer determines that a first PaaK device that does not have an associated back-up password is present inside the vehicle and is a valid (authorized) device for the vehicle. The computer also determines that a valid (authorized) passive entry passive start (PEPS) key fob is present inside the vehicle and that the engine of the vehicle has been placed in a run state by use of the first PaaK device or a second PaaK device that is authorized for use in starting the vehicle. A prompt is then provided on a display in the vehicle to allow an occupant of the vehicle to enter a password for use on the first PaaK device. The computer checks to determine if the password is already in use. If the password is not already in use, the computer links the password to the first PaaK device and authorizes the use of the password associated with the first PaaK device as a valid keyless starting password for the vehicle.

Illustrative Embodiments

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, words such as "wireless" or "wirelessly" as used herein in the context of communication links are not intended to preclude other forms of communication links such as optical communication links and wired communication links that may be used alternatively. It should be understood that some or all of the description provided herein with respect to a "password" may be equally applicable to a keypad code that is used to open/close a door of a vehicle, or a passcode (a number, a word, an alphanumeric entry, etc.) that is entered into a graphical user interface (GUI) in the vehicle for starting the vehicle. Thus, for example, various steps of a procedure for generating a password should be understood to encompass equivalent steps for generating a keypad code. Furthermore, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

FIG. 1 shows an exemplary vehicle 115 that supports various remote, passive, and keyless operations in accordance with the disclosure. The vehicle 115 may be any of various types of vehicles such as a gasoline powered vehicle, an electric vehicle, a hybrid electric vehicle, or an autonomous vehicle, and may include components such as a vehicle computer 110, an infotainment system 145, a remote, passive, and keyless entry management system 105, and a wireless communication system. The vehicle computer 110 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). In some cases, the vehicle computer 110 may include more than one computer such as, for example, a first computer that controls engine operations and a second computer that operates the infotainment system 145.

The infotainment system 145 can be an integrated unit that includes various components such as a radio, streaming audio solutions, and USB access ports for digital audio devices, with elements such as a navigation system that provides navigation instructions to a driver of the car. In an exemplary implementation, the infotainment system 145 has a display system that includes a graphical user interface (GUI) for use by an occupant of the vehicle 115. The GUI may be used for various purposes such as to make a request for a back-up password to be associated with a phone-as-a-key (PaaK) device account and/or to input destination information for obtaining travel guidance from the navigation system.

The keyless entry management system 105 may be configured to interact with various types of components in the vehicle 115. For example, the keyless entry management system 105 may be configured to control various operations such as locking and unlocking of the doors of the vehicle 115, receiving and verifying a password, and enabling an engine-start push-button 155 in the vehicle 115 upon verification of a password.

In an exemplary implementation in accordance with the disclosure, the keyless entry management system 105 may be configured to support wireless communications for PEPS with one or more PaaK devices and one or more key fobs. In this exemplary implementation, a PaaK device 120 is a smartphone configured to run a PaaK software application. The PaaK software application allows the PaaK device 120 to be used for performing various operations such as locking or unlocking a door of the vehicle 115 and/or for starting the engine of the vehicle 115. In at least some cases, the PaaK device 120 may eliminate the need to use the factory key fob, which can prove particularly useful in certain situations such as when the factory key is lost or has been accidentally misplaced.

The PaaK device 120 may use one or more of various wireless technologies such as Bluetooth®, Ultra-Wideband, Wi-Fi, Zigbee®, or near-field-communications (NFC), for carrying out wireless communications. In one exemplary implementation, a first set of wireless communication nodes 130a, 130b, 130c, and 130d may be provided on the body of the vehicle 115. In an alternative implementation, a single wireless communication node may be mounted upon the roof of the vehicle 115. The PaaK device 120 may communicate with the vehicle computer 110 via one or more of the first set of wireless communication nodes 130a, 130b, 130c, and 130d so as to allow, for example, an occupant of the vehicle 115 to start the engine before entering the vehicle 115. A radiation pattern of each of the antennas in the wireless communication nodes 130a, 130b, 130c, and 130d may be oriented outwards so as to provide the greatest wireless coverage outside the vehicle 115.

A second set of wireless communication nodes 135a, 135b, 135c, and 135d may be used to provide wireless coverage in the cabin area of the vehicle 115. A radiation pattern of each of the antennas in the wireless communication nodes 135a, 135b, 135c, and 135d may be oriented in a manner that provides optimized wireless coverage inside the vehicle. The keyless entry management system 105 may use some or all of the wireless communication nodes 135a, 135b, 135c, and 135d to communicate with one or more PaaK devices located inside the vehicle 115. In one exemplary operation, the keyless entry management system 105 may use three or more of the wireless communication nodes 135a, 135b, 135c, and 135d to carry out a received signal strength indication (RSSI) and/or a time-of-flight (ToF) trilateration procedure to locate one or more PaaK devices inside the vehicle 115. For example, the RSSI and/or ToF trilateration procedure may allow the keyless entry management system 105 to locate and identify a first PaaK device carried by a driver in the vehicle 115 and a second PaaK device carried by a passenger in the vehicle 115.

The PEPS key fob 125 may use one or more of various wireless technologies such as Bluetooth®, Ultra-Wideband, Wi-Fi, Zigbee®, or near-field-communications (NFC), for carrying out wireless communications. In one exemplary implementation, the PEPS key fob 125 communicates with one of the wireless communication nodes 130a, 130b, 130c, and 130d to allow a holder of the PEPS key fob 125 to open a door of the vehicle 115 passively, or by depressing a first button on the PEPS key fob 125. The PEPS key fob 125 may include various other buttons such as a door lock button and a panic button. The PEPS key fob 125 may also be used to start the vehicle 115. This action may be carried out by the keyless entry management system 105 sensing the presence of the PEPS key fob 125 inside the vehicle 115 and enabling the engine-start push-button 155 to allow the driver to start the vehicle 115.

In an exemplary embodiment in accordance with the disclosure, the PEPS key fob 125 is linked to the PaaK device 120. For example, the keyless entry management system 105 may use a key index to recognize that the PEPS key fob 125 and the PaaK device 120 are possessed (and operated) by an individual such as the driver of the vehicle 115. In another exemplary embodiment in accordance with the disclosure, some of the functionality provided by the PEPS key fob 125 may be provided in a different form such as in the form of an NFC card, an identification card, or a biometric device (eye scanner, facial scanner, etc.).

The exemplary vehicle 115 may include a keypad 160 that is located on a driver side door of the vehicle. Similar keypads may be located on other doors of the vehicle 115. A keypad code that is selected by the driver of the vehicle 115 can be used to operate the keypad 160 for opening the driver side door of the vehicle 115. The keyless entry management system 105 may manage various operations associated with the keypad 160 such as verifying a keypad code entered into the keypad 160 and/or processing a request for a new keypad code.

In the exemplary embodiment shown in FIG. 1, the keyless entry management system 105 is communicatively coupled to a server computer 140 via a network 150. The network 150 may include any one, or a combination of networks, such as a local area network (LAN), a wide area network (WAN), a telephone network, a cellular network, a cable network, a wireless network, and/or private/public networks such as the Internet. For example, the network 150 may support communication technologies such as Bluetooth®, cellular, near-field communication (NFC), Wi-Fi, Wi-Fi direct, machine-to-machine communication, and/or man-to-machine communication. At least one portion of the network 150 includes a wireless communication link that allows the server computer 140 to communicate with one or more of the wireless communication nodes 130a, 130b, 130c, and 130d on the vehicle 115. The server computer 140 may communicate with the keyless entry management system 105 for various purposes such as for password registration and/or password verification.

Figure 2:
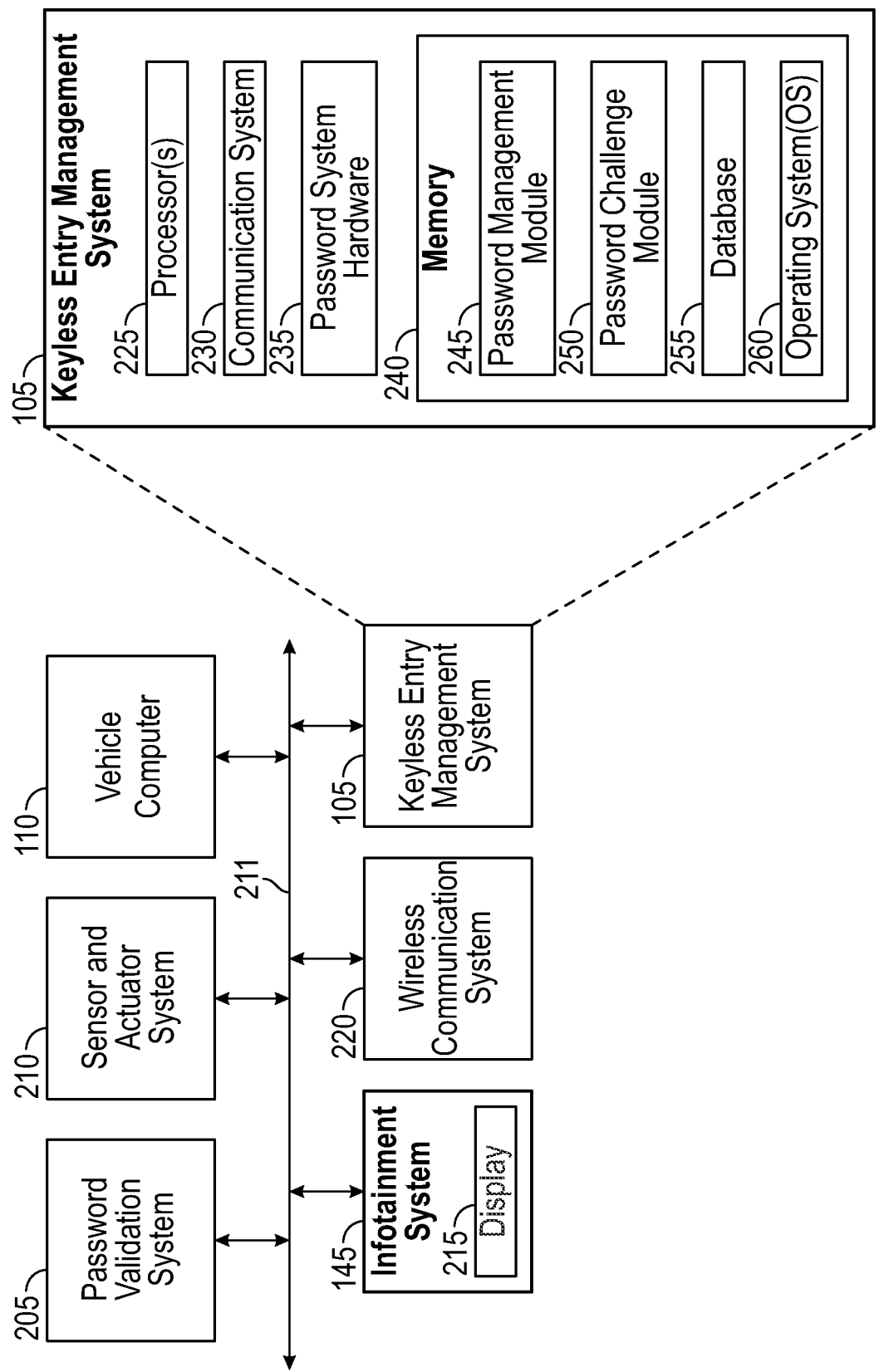
FIG. 2 shows some exemplary components that may be included in the vehicle shown in FIG. 1.

FIG. 2 shows some exemplary components that may be included in the vehicle 115. The exemplary components may include the vehicle computer 110, the infotainment system 145, a password validation system 205, a wireless communication system 220, a sensor and actuator system 210, and the keyless entry management system 105. The various components are communicatively coupled to each other via one or more buses such as an exemplary bus 211. The bus 211 may be implemented using various wired and/or wireless technologies. For example, the bus 211 can be a vehicle bus that uses a controller area network (CAN) bus protocol, a Media Oriented Systems Transport (MOST) bus protocol, and/or a CAN flexible data (CAN-FD) bus protocol. Some or all portions of the bus 211 may also be implemented using wireless technologies such as Bluetooth®, Bluetooth®, Ultra-Wideband, Wi-Fi, Zigbee®, or near-field-communications (NFC). For example, the bus 211 may include a Bluetooth® communication link that allows the password validation system 205 and/or the keyless entry management system 105 to wirelessly communicate with each other and/or with the vehicle computer 110.

The infotainment system 145 can include a display system 215 having a GUI for carrying out various operations. The GUI may be used, for example, to enter a password during a password registration procedure. The entered password may be communicated to the password validation system 205 which communicates with the keyless entry management system 105 to execute a password registration procedure. As described below in more detail, the password registration procedure may include a handshake sequence between the password validation system 205 and the keyless entry management system 105 and other security measures so as to ensure security and maintain an integrity of the password.

The sensor and actuator system 210 can include various types of sensors such as, for example, a seat pressure sensor for detecting the presence of one or more occupants in the vehicle 115 and an object sensor for detecting various objects such as the PEPS key fob 125 when the PEPS key fob 125 is present in the vehicle 115, or an NFC card placed in or on a glove compartment sensor of the vehicle 115. The sensor and actuator system 210 can also include various types of actuators such as, for example, an actuator to enable operation of the engine-start push-button 155 in the vehicle 115 after the keyless entry management system 105 has verified and validated an entered password.

The wireless communication system 220 can include various wireless communication nodes such as the wireless communication nodes 130a, 130b, 130c, and 130d and wireless communication nodes 135a, 135b, 135c, and 135d. In one exemplary implementation, some or all of the wireless communication nodes can include a Bluetooth® low energy module (BLEM) and/or a Bluetooth® low energy antenna module (BLEAM).

The keyless entry management system 105 may include a processor 225, a communication system 230, password system hardware 235, and a memory 240. The communication system 230 can include one or more wireless transceivers (BLEMs, for example) that allow the keyless entry management system 105 to transmit and/or receive various types of data from the password validation system 205 via the wireless communication system 220. The communication system 230 can also include hardware for communicatively coupling the keyless entry management system 105 to the network 150 for carrying out communications and data transfers with the server computer 140. In an exemplary embodiment in accordance with the disclosure, the communication system 230 includes various security measures to ensure that messages transmitted between the keyless entry management system 105 and other elements such as the password validation system 205 are not intercepted for malicious purposes. For example, the communication system 230 may be configured to provide features such as encryption and decryption of messages, time windows for transmitting and/or receiving of messages, and radio-frequency (RF) safeguards for RF signal transmissions.

The password system hardware 235 may include hardware such as one or more application specific integrated circuits (ASICs) containing circuitry that allows the keyless entry management system 105 to interface with components such as the password validation system 205 and/or the infotainment system 145 for carrying out various actions in accordance with the disclosure.

The memory 240, which is one example of a non-transitory computer-readable medium, may be used to store an operating system (OS) 260, a database 255, and various code modules such as a password management module 245 and a password challenge module 250. The code modules are provided in the form of computer-executable instructions that can be executed by the processor 225 for performing various operations in accordance with the disclosure.

The password management module 245 may be executed by the processor 225 for performing various operations related to passwords. For example, the password management module 245 may cooperate with the password validation system 205 for registering new passwords or keypad codes and/or for validating a password that is entered into the password validation system 205 via the infotainment system 145 or associated with the PaaK device 120. Validating a password may include the password challenge module 250 issuing a challenge to the password validation system 205 for purposes of ensuring that a valid password request has been originated via the password validation system 205.

In one exemplary implementation, the database 255 may be used to store passwords related to one or more drivers of the vehicle 115. In another exemplary implementation, passwords related to one or more drivers of the vehicle 115 may be stored on the server computer 140 and fetched by the keyless entry management system 105 on an as-needed basis. In yet another exemplary implementation, passwords related to one or more drivers of the vehicle 115 may be stored in a cloud storage system and fetched by the keyless entry management system 105 on an as-needed basis. In some or all such implementations, the passwords may be stored in hashed form for security purposes.

It must be understood that even though the various components in FIG. 2 are shown as discrete functional blocks, some of these components, or some parts of these components, may be combined together in some implementations in accordance with the disclosure. For example, in one exemplary implementation, the password validation system 205 may be integrated with the keyless entry management system 105 and the processor 225 configured to execute operations of the password validation system 205 as well as the keyless entry management system 105. In another implementation, the password validation system 205 and/or the keyless entry management system 105 may be integrated with the vehicle computer 110.

Figure 3:
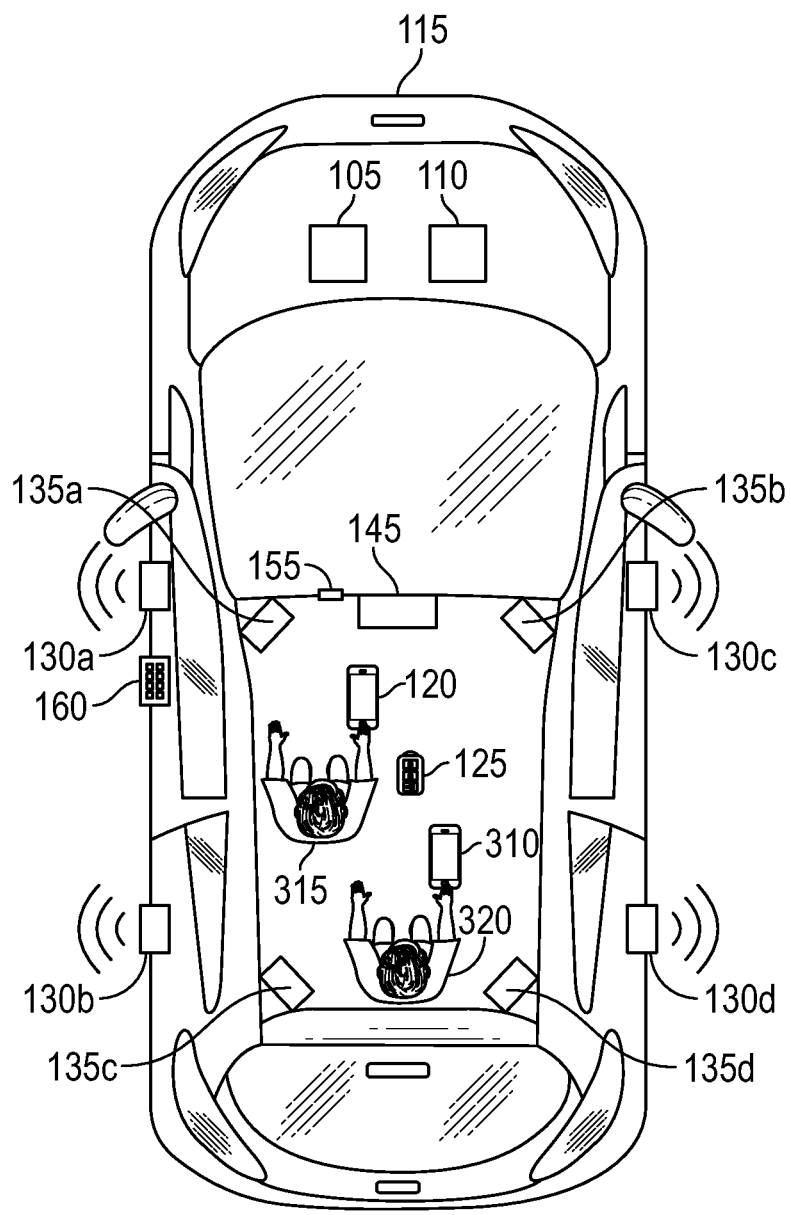
FIG. 3 shows an exemplary configuration for creating a password and/or a keypad code for use upon a vehicle, in accordance with an embodiment of the disclosure.

FIG. 3 shows an exemplary configuration for creating a password and/or a keypad code for use in the vehicle 115 in accordance with an embodiment of the disclosure. In this exemplary configuration, a driver 315 of the vehicle 115 may use the PaaK device 120 to start the engine of the vehicle 115. The PaaK device is recognized by the keyless entry management system 105 as a device that is authorized for use with the vehicle 115. Alternatively, the driver 315 may enter a password into the infotainment system 145. The keyless entry management system 105 processes the password and enables the engine-start push-button 155 if the password is found to be valid. The driver 315 presses the engine-start push-button 155 to start the engine of the vehicle 115.

A passenger 320 in the vehicle 115 (a spouse of the driver 315, for example) may desire to obtain a password associated with a PaaK device 310 and a keypad code for use on the keypad 160 on the door of the vehicle 115. The PaaK device 310 may be a smartphone that the passenger 320 has acquired recently and wishes to use to start the vehicle 115 when the vehicle 115 is available for driving by the passenger 320.

Figure 4:
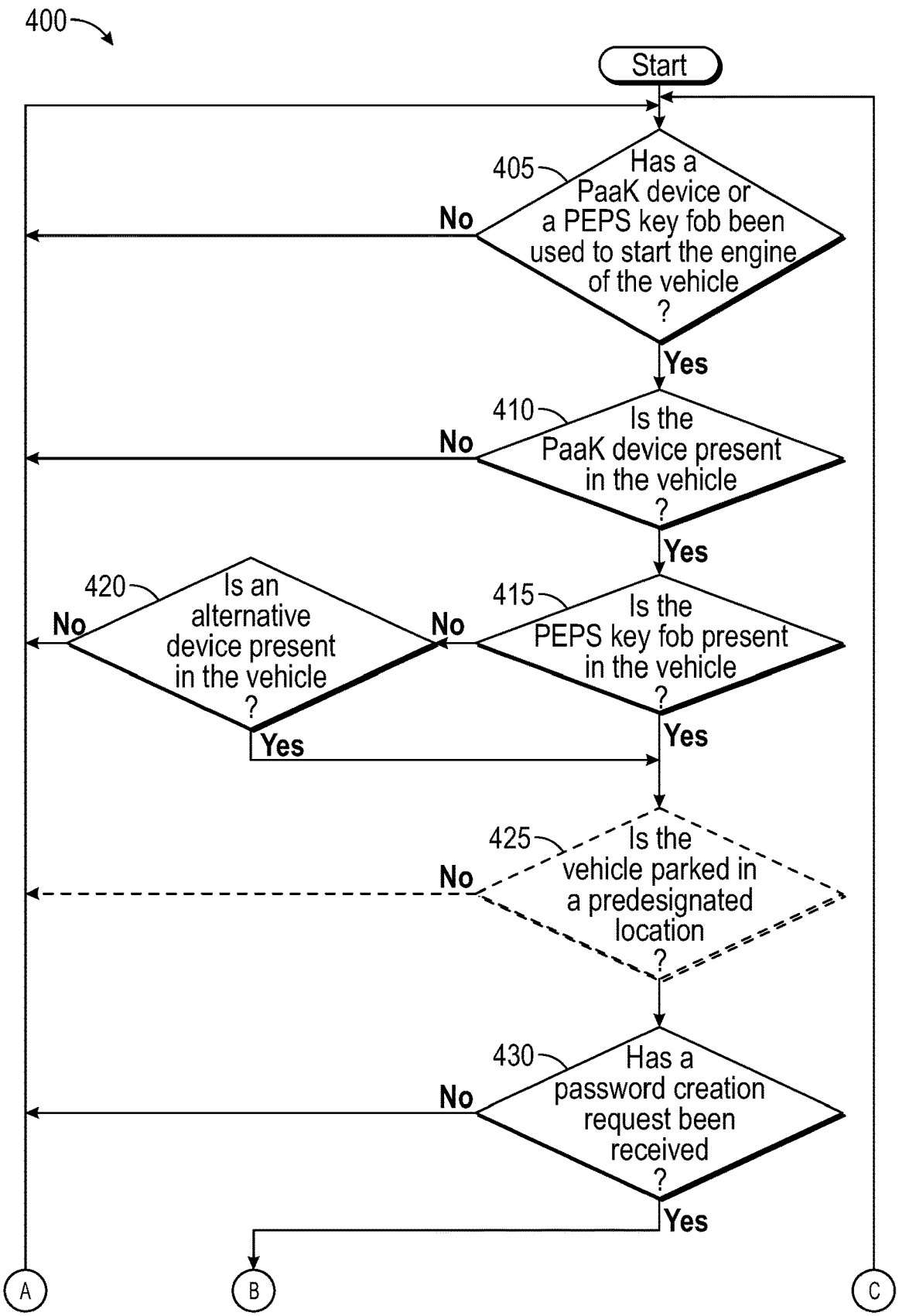
FIG. 4 shows a flowchart of an exemplary method for creating a password in a keyless starting system of a vehicle in accordance with the disclosure.
Figure 4:
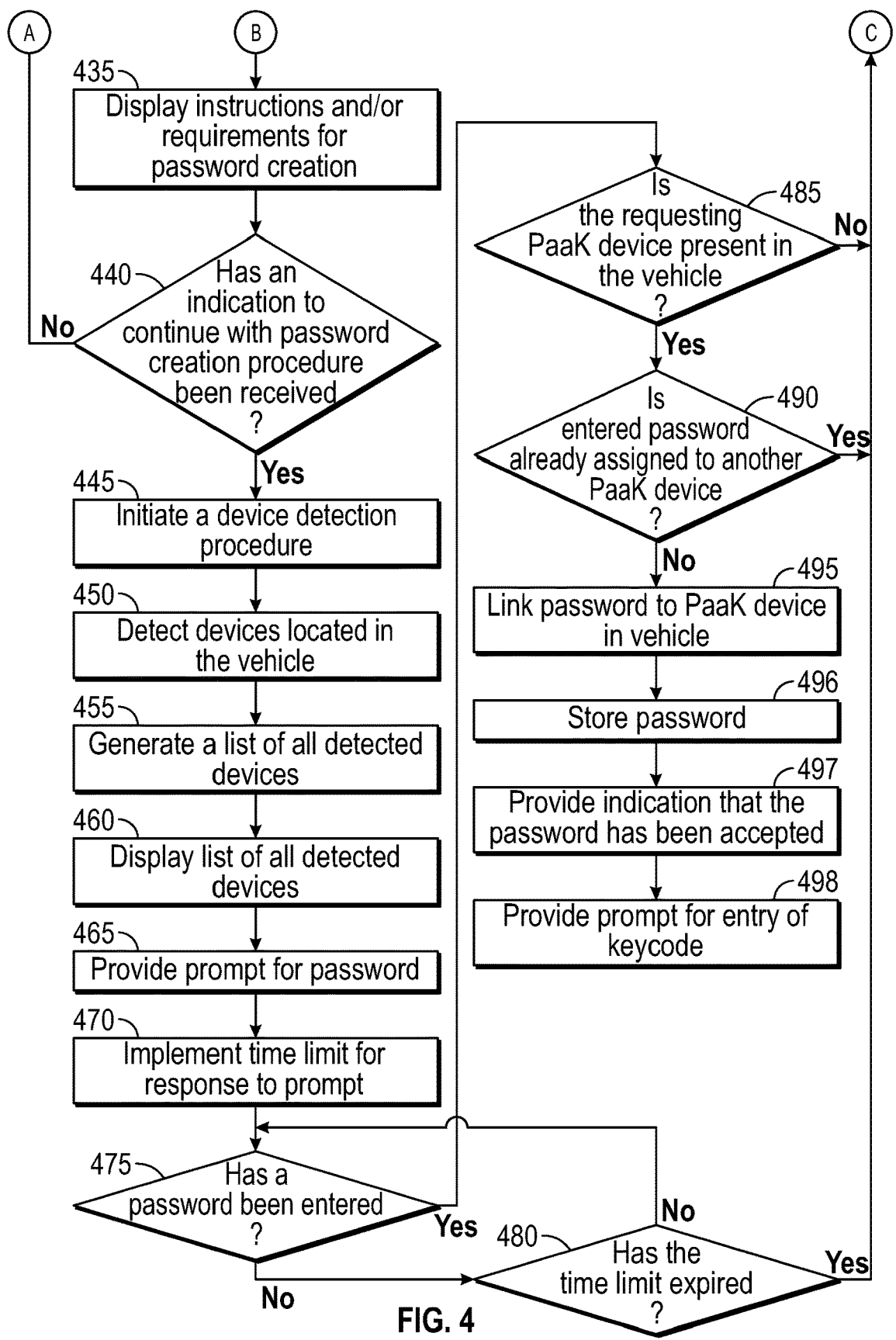

FIG. 4 shows a flowchart 400 of an exemplary method in accordance with the disclosure that may be used for creating a password associated with the PaaK device 310 of the passenger 320. The flowchart 400 illustrates a sequence of operations that can be implemented in hardware, software, or a combination thereof. In the context of software, the operations represent computer-executable instructions stored on one or more non-transitory computer-readable media such as the memory 240, that, when executed by one or more processors such as the processor 225, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 400 may be carried out by using the keyless entry management system 105, the password validation system 205, the infotainment system 145, the keypad 160, and one or more PaaK devices. The description below may make reference to certain components and objects shown in FIGS. 1-3, but it should be understood that this is done for purposes of explaining certain aspects of the disclosure and that the description is equally applicable to many other embodiments.

At block 405, a determination is made whether a PaaK device (such as the PaaK device 120) or a key fob (such as the PEPS key fob 125) was used to place the engine of the vehicle 115 in an accessory state or run state. The use of either of these devices to start the engine provides an indication to the keyless entry management system 105 that at least one authorized operator having a PaaK device with a valid password and/or having a PEPS key fob is present in the vehicle 115. In some cases, the creation of the password associated with the PaaK device 310 of the passenger 320 may be allowed only if an authorized PaaK device or an authorized PEPS key fob has been used to start the engine. This step may be directed at preventing unauthorized occupants of the vehicle 115 (a parking lot attendant or a car thief, for example) from creating a password or keypad code. Additionally, in at least some implementations, the creating of the password associated with the PaaK device 310 of the passenger 320 may not be allowed if the vehicle 115 is not placed in a parked condition when the engine is running. This operation ensures that the password creating procedure is carried out in a safe manner without the driver 315 being distracted when driving. Appropriate warning messages and/or error messages may be displayed during this operation as well as other operations described with reference to the flowchart 400.

At block 410, a determination may be made whether an authorized PaaK device (such as the PaaK device 120) is present inside the vehicle 115. The determination may be carried out in various ways. In one exemplary approach, the wireless communication system 220 may carry out a RSSI and/or ToF trilateration procedure to detect and locate the PaaK device 120. The RSSI and/or ToF trilateration procedure may also be used to detect and locate additional PaaK devices such as the PaaK device 310 carried by the passenger 320.

At block 415, a determination may be made whether a PEPS key fob (such as the PEPS key fob 125) is also present inside the vehicle 115. The determination may be carried out in various ways. In one exemplary approach, one or more sensors of the sensor and actuator system 210 may be used to detect the PEPS key fob 125. For example, a sensor located in or near a glove compartment of the vehicle 115 may be used to detect the PEPS key fob 125 when the PEPS key fob 125 is placed in the glove compartment.

If no PEPS device is detected inside the vehicle 115, at block 420, a determination may be made whether an alternative device to the PEPS key fob 125 is present in the vehicle 115. For example, in some cases, the driver 315 may opt to use an identification object such as a NFC card or a fingerprint input device in lieu of the PEPS key fob 125.

The creation of the password associated with the PaaK device 310 of the passenger 320 may not be allowed if the PaaK device 120 and the PEPS key fob 125 (or an alternative ID element) are not present in the vehicle 115. Detecting the presence of both the PaaK device 120 and the PEPS key fob 125 inside the vehicle 115 may be directed at preventing unauthorized occupants of the vehicle 115 (a parking lot attendant or a car thief, for example) from creating a password or keypad code. However, in some implementations, creating of a new password may be allowed if at least one of the PaaK device 120 or the PEPS key fob 125 is present in the vehicle 115.

At block 425, a determination may be made whether the vehicle 115 is parked in a predesignated location such as, for example, a residence of the driver 315 or a car dealership associated with the vehicle 115. This action provides an additional safeguard to prevent unauthorized occupants of the vehicle 115 (a parking lot attendant or a car thief, for example) from creating a password or keypad code. However, this action may be omitted in some embodiments so as to allow for more flexibility in creating a password.

At block 430, determination may be made whether a password creation request has been received by the password validation system 205. In one exemplary case, the password creation request may be originated by the driver 315 using the GUI on the display system 215 of the infotainment system 145. In another exemplary case, the password creation request may be originated by the driver 315 using the PaaK device 120. In yet another exemplary case, the password creation request may be originated by the passenger 320 using the PaaK device 310.

At block 435, the password validation system 205 may provide on the display system 215 of the infotainment system 145, a set of instructions and/or requirements for creating a password. At block 440, a determination may be made whether the driver 315 has provided an indication that he/she wishes to continue with the password creation procedure.

Upon receiving such an indication, at block 445, the password validation system 205 may initiate a device detection procedure for detecting all PaaK devices and PEPS key fob that are present in the vehicle 115. Various types of security measures may be taken when conducting the detection procedure. One exemplary security measure involves the password validation system 205 sending out one or more encrypted messages to the keyless entry management system 105. The encrypted messages may include the use of a salt and/or a nonce.

At block 450, the keyless entry management system 105 may use the communication system 230 to communicate with the wireless communication system 220 of the vehicle 115 for detecting all PaaK devices and PEPS key fobs that are present in the vehicle 115. During this interaction, the keyless entry management system 105 may use the password management module 245 and the password challenge module 250 to carry out secure handshake procedures with the wireless communication system 220 and/or the password validation system 205. The wireless communication system 220 may carry out a RSSI and/or ToF trilateration procedure to locate all PaaK devices and PEPS key fobs that are present in the vehicle 115. The keyless entry management system 105 may then determine which of the PaaK devices have associated key indexes and/or valid passwords, and/or which of the PEPS devices have associated key indexes. In this example, the keyless entry management system 105 determines that among all PaaK devices and PEPS devices that are present in the vehicle 115, the PaaK device 120 has an associated key index and a valid password, the PEPS key fob 125 has a valid key index, and the PaaK device 310 does not have a key index or a password.

At block 455, the keyless entry management system 105 passes on the detection results to the password validation system 205 in accordance with the security measures imposed by the password validation system 205. For example, the keyless entry management system 105 may provide an appropriate response to the salt and/or the nonce in the encrypted request originated by the password validation system 205. The password validation system 205 may validate the response so as to ensure that the information is being provided by the keyless entry management system 105 and not by a malicious entity.

At block 460, the password validation system 205 may provide upon the display system 215 of the infotainment system 145 and/or upon the PaaK device 120, a list of all the PaaK devices and PEPS key fobs detected in the vehicle 115, together with instructions and guidance for password submission. The displayed content may also include a query to find out if the driver 315 wishes to proceed with password submission and if so, to select one of the PaaK devices that does not have an associated password. In this example, the driver 315 may be instructed to select the PaaK device 310 if the driver 315 wishes to proceed with the password request.

Upon receiving an indication from the driver 315 that the driver would like to associate a password with the PaaK device 310, at block 465, the password validation system 205 may provide a prompt upon the display system 215 of the infotainment system 145 and/or upon the PaaK device 310 for entering of a password. The prompt may be accompanied by guidance, such as requirements for a valid password, and entry of a password two times so as to ensure accuracy.

At block 470, a time limit for receiving a response to the prompt may be set by the password validation system 205. A count-down timer or other such element may be used to implement a time window for the time limit operation. Setting a time limit may minimize the chances of an improper use of the password prompt.

At block 475, a determination may be made whether a password has been entered. If no password has been entered (by either the driver 315 or the passenger 320), at block 480, a determination is made whether the time limit has expired. If the time limit has expired, any password that is subsequently received may be ignored.

If the time limit has not expired, at block 485, a determination is made whether the PaaK device 310 is still present in the vehicle 115. In an exemplary implementation, this operation may include secure communication procedures between various components such as the password validation system 205 and the keyless entry management system 105.

At block 490, the keyless entry management system 105 makes a determination whether the password that was entered is already associated with another PaaK device. The keyless entry management system 105 may make this determination by using the password management module 245 to fetch and inspect passwords stored in the database 255 and/or other data storage elements such as the server computer 140 and cloud storage.

If the password has been already assigned, the password validation system 205 may provide upon the display system 215 of the infotainment system 145, a message that indicates that the password is already taken and that a new password may be entered.

If the password is unassigned, at block 495, the keyless entry management system 105 may assign a key index to the PaaK device 310 and link the password to the PaaK device 310. Linking the password to the PaaK device 310 ensures that no other PaaK device can use the linked password.

At block 496, the password may be stored in the database 255 and/or other storage elements. In an exemplary embodiment in accordance with the disclosure, the password may be stored in the database 255 using various security measures such as, for example, using a hashed format. In an exemplary implementation, the database 255 is a Bluetooth® low energy module (BLEM). A hash and/or a hashed password may be stored in the BLEM and/or in a memory device that is a part of a cloud storage system.

At block 497, the password validation system 205 may provide upon the display system 215 of the infotainment system 145, a message that indicates that the password has been accepted and can be used henceforth. The password validation system 205 may also seek a confirmation response from the PaaK device 310 to ensure that the password has been received and accepted in the PaaK device 310.

At block 498, the password validation system 205 may provide upon the display system 215 of the infotainment system 145, a prompt for entering of a keypad code for use upon a keypad on a door of the vehicle 115. The prompt may be accompanied by instructions such as to enter a keypad code twice so as to ensure accuracy.

Operations that are substantially similar to those described above with respect to blocks 465 and subsequent blocks for creating a password for the PaaK device 310 may be executed for providing a keypad code that may be used for operating the keypad 160. The keypad code may be assigned a key index that is uniquely associated with the keypad code.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 240, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    determining that at least a first phone-as-a-key (PaaK) device is present inside a vehicle during a first time period;
    determining that at least a first passive entry passive start (PEPS) key fob is present inside the vehicle during a second time period;
    providing, a prompt to enter a password;
    receiving a first signal comprising a first password during the first time period;
    disregarding the first signal based on determining that the first PaaK device is not present inside the vehicle during the first time period;
    receiving a second signal comprising a second password during the second time period;
    determining, based on determining that the first PaaK device and the first PEPS key fob are present during the second time period, that the second password that is entered in response to the prompt is unassigned;
    linking, after determining that the second password is unassigned, the second password to the first PaaK device; and
    authorizing the second password as a valid keyless starting password for the vehicle.

2. The method of claim 1, wherein providing the prompt is subject to confirming that one of a second PaaK device or a second PEPS key fob has been used to place an engine of the vehicle in a run state, wherein the one of the second PaaK device or the second PEPS key fob is authorized for use in the vehicle.

3. The method of claim 1, wherein providing the prompt comprises:
    transmitting a first wireless signal as a part of a password registration procedure; and
    receiving a second wireless signal containing the first password.

4. The method of claim 3, further comprising:
    determining that the second wireless signal is received before an expiration of a preset time window.

5. The method of claim 4, wherein the first password is rejected if the second wireless signal is not received before the expiration of the preset time window.

6. The method of claim 3, wherein the first password is rejected if the first password is linked to another PaaK device.

7. The method of claim 1, wherein determining that at least the first PaaK device is present inside the vehicle comprises at least one of determining that the first PaaK device is plugged into a communications port in the vehicle or that the first PaaK device has been validated by a wireless handshake procedure.

8. A method executed by a computer, the method comprising:
    transmitting, to a display system that is located inside a vehicle, a first wireless signal as a part of a password registration procedure;
    setting a time window for receiving a response from the display system;
    receiving, from the display system, a second wireless signal comprising a first password;
    determining, that the second wireless signal is received before an expiration of the time window;
    disregarding the second wireless signal based on determining that at least one of a first phone-as-a-key (PaaK) device is not present inside the vehicle or a first passive entry passive start (PEPS) key fob is not present inside the vehicle;
    receiving a signal comprising a second password;
    processing, when received before the expiration of the time window, the signal to determine that the second password provided via the signal is unassigned;
    linking, after determining that the second password is unassigned, the second password to the first PaaK device that is present inside the vehicle; and
    authorizing the second password as a valid keyless starting password for the vehicle.

9. The method of claim 8, further comprising:
    determining that one of a second PaaK device or a second PEPS key fob has been used to place an engine of the vehicle in one of an accessory state or a run state, wherein the one of the second PaaK device or the second PEPS key fob is authorized for use in the vehicle; and transmitting the first wireless signal subject to confirming that the vehicle is in the one of the accessory state or the run state and that each of the second PaaK device and the second PEPS key fob is present in the vehicle.

10. The method of claim 9, further comprising:

disregarding the signal if at least one of: the first PaaK device is not present inside the vehicle, the second PaaK device is not present inside the vehicle, or the signal is received after expiration of the time window.

11. The method of claim 9, further comprising:

determining that at least one of the second PEPS key fob or a personal identification element is identified in the vehicle prior to transmitting the first wireless signal to the display system, wherein the personal identification element is one of a biometric trait of an individual or a near field communication (NFC) device.

12. The method of claim 9, further comprising:

determining that the first PaaK device is present inside the vehicle prior to transmitting the first wireless signal to the display system.

13. The method of claim 12, wherein determining that the first PaaK device is present inside the vehicle prior to transmitting the first wireless signal comprises at least one of determining that the first PaaK device is plugged into a communications port in the vehicle or that the first PaaK device has been used to place the engine of the vehicle in the one of the accessory state or the run state from inside the vehicle.

14. The method of claim 8, further comprising:

encrypting the first password; and storing the encrypted first password in at least a first memory device that is located in the vehicle or is a part of a cloud storage system.

15. A computer comprising:

at least one memory that stores computer-executable instructions; and at least one processor configured to access the at least one memory and execute the computer-executable instructions to at least:

determine that at least a first phone-as-a-key (PaaK) device is present inside a vehicle during a first time period;

determine that at least a first passive entry passive start (PEPS) key fob is present inside the vehicle during a second time period;

provide a prompt to enter a password;

receive a first signal comprising a first password during the first time period;

disregard the first signal based on determining that the first PaaK device is not present inside the vehicle during the first time period;

receive a second signal comprising a second password during the second time period;

determine, based on determining that the first PaaK device and the first PEPS key fob are present during the second time period, that the second password that is entered in response to the prompt is unassigned;

link the second password to the first PaaK device after determining that the second password is unassigned; and authorize the second password as a valid keyless starting password for the vehicle.

16. The computer of claim 15, wherein the at least one processor is configured to access the at least one memory and execute additional computer-executable instructions to:

confirm that one of a second PaaK device or a second PEPS key fob has been used to place an engine of the vehicle in one of an accessory state or a run state;

determine that the one of the second PaaK device or the second PEPS key fob is authorized for use in the vehicle; and provide the prompt subject to confirming that the one of the second PaaK device or the second PEPS key fob is authorized for use in the vehicle and has been used to place the engine of the vehicle in the run state.

17. The computer of claim 15, wherein the at least one processor is configured to access the at least one memory and execute additional computer-executable instructions to:

transmit to a display system in the vehicle, a first wireless signal as a part of a password registration procedure; and receive, from the display system, a second wireless signal containing the first password.

18. The computer of claim 17, wherein the at least one processor is configured to access the at least one memory and execute additional computer-executable instructions to:

determine that the second wireless signal is received before an expiration of a preset time window.

19. The computer of claim 18, wherein the at least one processor is configured to access the at least one memory and execute additional computer-executable instructions to:

reject the first password if the second wireless signal is received after the expiration of the preset time window.

20. The computer of claim 17, wherein the at least one processor is configured to access the at least one memory and execute additional computer-executable instructions to:

reject the first password if the first password is linked to another PaaK device.

* * * * *